(12) United States Patent
Tetsuka et al.

(10) Patent No.: US 9,869,608 B2
(45) Date of Patent: Jan. 16, 2018

(54) VEHICLE METER INDICATOR DEVICE

(71) Applicant: HONDA MOTOR CO., LTD., Tokyo (JP)

(72) Inventors: Takashi Tetsuka, Wako (JP); Takeshi Kitajima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 209 days.

(21) Appl. No.: 14/808,508

(22) Filed: Jul. 24, 2015

(65) Prior Publication Data

US 2016/0033364 A1 Feb. 4, 2016

(30) Foreign Application Priority Data

Jul. 31, 2014 (JP) .................................. 2014-156172

(51) Int. Cl.
| | |
|---|---|
| *G01M 15/04* | (2006.01) |
| *G01D 1/00* | (2006.01) |
| *G01D 3/10* | (2006.01) |
| *G01D 7/06* | (2006.01) |

(52) U.S. Cl.
CPC ............ *G01M 15/046* (2013.01); *G01D 1/00* (2013.01); *G01D 3/10* (2013.01); *G01D 7/06* (2013.01); *B60K 2350/352* (2013.01)

(58) Field of Classification Search
CPC .......... G01M 15/046; G01D 3/10; G01D 7/06

USPC ....................................................... 73/114.25
See application file for complete search history.

(56) References Cited

U.S. PATENT DOCUMENTS

2010/0283597 A1* 11/2010 Yoda ...................... B60K 35/00
340/461
2016/0138468 A1* 5/2016 Shibata .................... G01D 7/00
701/110

FOREIGN PATENT DOCUMENTS

JP          5000728          8/2012

* cited by examiner

*Primary Examiner* — Peter Macchiarolo
*Assistant Examiner* — Timothy Graves
(74) *Attorney, Agent, or Firm* — Rankin, Hill & Clark LLP (57) ABSTRACT

To show an image with minimal sense of discomfort felt by an occupant without quickening an updating cycle of an on-screen image, a virtual data generator making up a vehicle meter indicator device generates virtual data based on an arbitrary engine rotation speed between an engine rotation speed proportional to an image currently shown on a liquid crystal display device and a latest engine rotation speed rather than display data based on the latest engine rotation speed immediately before updating if the engine rotation speed declines. This allows the liquid crystal display device to show the generated virtual data on a liquid crystal panel as a virtual image for updating.

14 Claims, 8 Drawing Sheets

LEFT ←——→ RIGHT

VEHICLE METER INDICATOR DEVICE

BACKGROUND OF THE INVENTION

Field of the Invention

The present invention relates to a vehicle meter indicator device designed to show display data, generated on the basis of the rotation speed of an internal combustion engine, on a meter unit as an image.

Description of Related Art

For example, Japanese Patent No. 5000728 discloses a meter indicator device designed to show, as an image, sensor information from sensors provided on a vehicle. If sensor information is acquired at a longer interval than the frame interval at which an image is to be displayed, the meter indicator device updates the image display position in such a manner that the image moves at the frame interval from a starting point to the image display position calculated on the basis of sensor information acquired at present. The starting point is the image display position calculated on the basis of acquired sensor position.

Incidentally, an image displayed on the meter unit making up the meter indicator device is generated on the basis of the latest sensor information detected by sensors. Therefore, when sensor information is acquired at a shorter interval than the frame interval at which an image is to be displayed, and even if sensor information acquired at each interval changes approximately continuously with respect to time, the image displayed on the meter unit at every frame interval, an updating cycle, undergoes a significant change as an on-screen image between an image displayed previously and an image displayed this time, showing an unsmooth and intermittent transformation. Therefore, an occupant of the vehicle feels a sense of discomfort to the image displayed on the meter unit in some cases.

In particular, if the rotation speed of the vehicle's internal combustion engine declines, a conspicuous difference is observed between the rotation speed as sensor information acquired at every acquisition interval and the rotation speed indicated by the image shown on the meter unit at every frame interval. That is, if the frame interval is longer than the acquisition interval, the frame interval cannot cope with the change in rotation speed, thus resulting in an image motion that produces a sense of discomfort. Further, the engine sound becomes smaller with reduction in rotation speed, thus making the occupant more attentive to the meter unit. As a result, the occupant is more likely to feel a sense of discomfort when the on-screen image of the meter unit changes.

A possible countermeasure for such a problem would be to quicken the updating cycle of an on-screen image shown on the meter unit so as to ensure smooth display of the image. However, quickening the updating cycle of the on-screen image leads to heavier calculation load for the on-screen image, thus resulting in higher cost of the computing device for generating images.

SUMMARY OF THE INVENTION

In light of the foregoing, it is an object of the present invention to provide a vehicle meter indicator device that keeps the cost to a minimum without quickening the updating cycle of an on-screen image and shows an image with minimal sense of discomfort perceived by the occupant.

A vehicle meter indicator device according to the present invention includes a rotation speed sensor, display data generator, and a meter unit. The rotation speed sensor detects the rotation speed of an internal combustion engine. The display data generator generates information based on the rotation speed at every given updating cycle as display data. The meter unit shows the display data as an image each time the display data generator generates the display data. The vehicle meter indicator device has, among others, the following features.

In accordance with a first feature, the display data generator generates display data based on the latest rotation speed detected by the rotation speed sensor at every updating cycle, causing the meter unit to show the generated display data as an image for updating. The vehicle meter indicator device further includes virtual data generator. The virtual data generator generates virtual data based on an arbitrary rotation speed between a rotation speed proportional to the image shown on the meter unit and the latest rotation speed, rather than the display data based on the latest rotation speed if the rotation speed declines, causing the meter unit to show the generated virtual data as a virtual image for updating.

According to the first feature of the present invention, during a period of decline in the rotation speed of an internal combustion engine in which a sense of discomfort, attributable to the change in on-screen image, is likely to be conspicuously felt, virtual data is generated on the basis of an arbitrary rotation speed between a rotation speed proportional to the image currently shown on the meter unit and the latest rotation speed immediately before updating detected by the rotation speed sensor, causing the meter unit to show the virtual image proportional to the generated virtual data for updating. This ensures minimal sense of discomfort attributable to the change in on-screen image. Further, it is possible to reduce the device cost while at the same time alleviating a sense of discomfort produced by the difference between the actual rotation speed of the internal combustion engine and the rotation speed shown on the meter unit. Further, there is no need to quicken the updating cycle. This makes it possible to reduce the loads of the display data generator and the virtual data generator and to ensure minimal heat generation from the display data generator and the virtual data generator.

In accordance with a second feature of the invention, if the rotation speed declines with the transmission of the internal combustion engine in the neutral position, the virtual data generator generates the virtual data.

According to the second feature of the present invention, if the transmission of the internal combustion engine is in the neutral position and idling, it is possible to alleviate a sense of discomfort produced by the difference between the actual rotation speed of the internal combustion engine and the rotation speed shown on the meter unit despite the snapping of the accelerator by the vehicle's occupant. It is possible to alleviate a sense of discomfort produced by the difference between the actual rotation speed of the internal combustion engine and the rotation speed shown on the meter unit particularly when the rotation speed of the internal combustion engine declines following warmup by increasing the rotation speed of the internal combustion engine.

In accordance with a third feature of the invention, the arbitrary rotation speed declines on a regular basis at every updating cycle relative to the rotation speed proportional to the image shown on the meter unit.

According to the third feature of the present invention, the meter unit shows, for updating, a virtual image proportional to the rotation speed that declines on a regular basis during reduction of the rotation speed, thus making a sense of discomfort, attributable to the change in on-screen image, unlikely to be felt conspicuously.

In accordance with a fourth feature of the invention, the vehicle meter indicator device still further includes display switching determination device. If the rotation speed declines, and if the change in the rotation speed is smaller than an arbitrary change threshold, the display switching determination device determines whether to cause the display data generator to generate display data based on the latest rotation speed and also cause the meter unit to show the generated display data as an image for updating.

According to the fourth feature of the present invention, if the change in the rotation speed is smaller than a change threshold, the meter unit shows, for updating, an image proportional to the latest rotation speed immediately before updating, effectively ensuring minimal sense of discomfort attributable to the change in displayed screen.

In accordance with a fifth feature of the invention, the display switching determination device determines that display data should be generated on the basis of an arbitrary rotation speed between the rotation speed proportional to the virtual image and the detected rotation speed at every updating cycle until the rotation speed proportional to the virtual image shown on the meter unit is exceeded even if the rotation speed detected by the rotation speed sensor starts to increase after having declined once. On the other hand, the display switching determination device determines that display data should be generated on the basis of the detected rotation speed if the detected rotation speed exceeds the rotation speed proportional to the virtual image and if the change in the detected rotation speed is greater than the change in the rotation speed proportional to the virtual image.

According to the fifth feature of the present invention, even if the rotation speed starts to increase after having declined once, the meter unit shows, for updating, virtual data until the rotation speed proportional to the virtual image shown on the meter unit is exceeded. This makes the difference between the actual rotation speed of the internal combustion engine and the rotation speed shown on the meter unit less conspicuous. Further, if the detected rotation speed exceeds the rotation speed proportional to the virtual image, and if the change in the detected rotation speed is greater than the change in the rotation speed proportional to the virtual image, display data is generated on the basis of the detected rotation speed, thus making it possible to detect a significant increase in rotation speed quickly. As a result, an increase in heat generation by the internal combustion engine can be detected as soon as possible. This keeps the cost to a minimum while at the same time effectively ensuring minimal thermal impact on the display data generator and the virtual data generator.

BRIEF DESCRIPTION OF THE DRAWINGS

These and further features of the invention will be apparent with reference to the following description and drawings, wherein.

DETAILED DESCRIPTION OF THE INVENTION

A detailed description will be given below of a vehicle meter indicator device according to the present invention by taking, as an example, a preferred embodiment in relation to a saddle type vehicle to which the vehicle meter indicator device is applied, with reference to the accompanying drawings.

Figure 1:
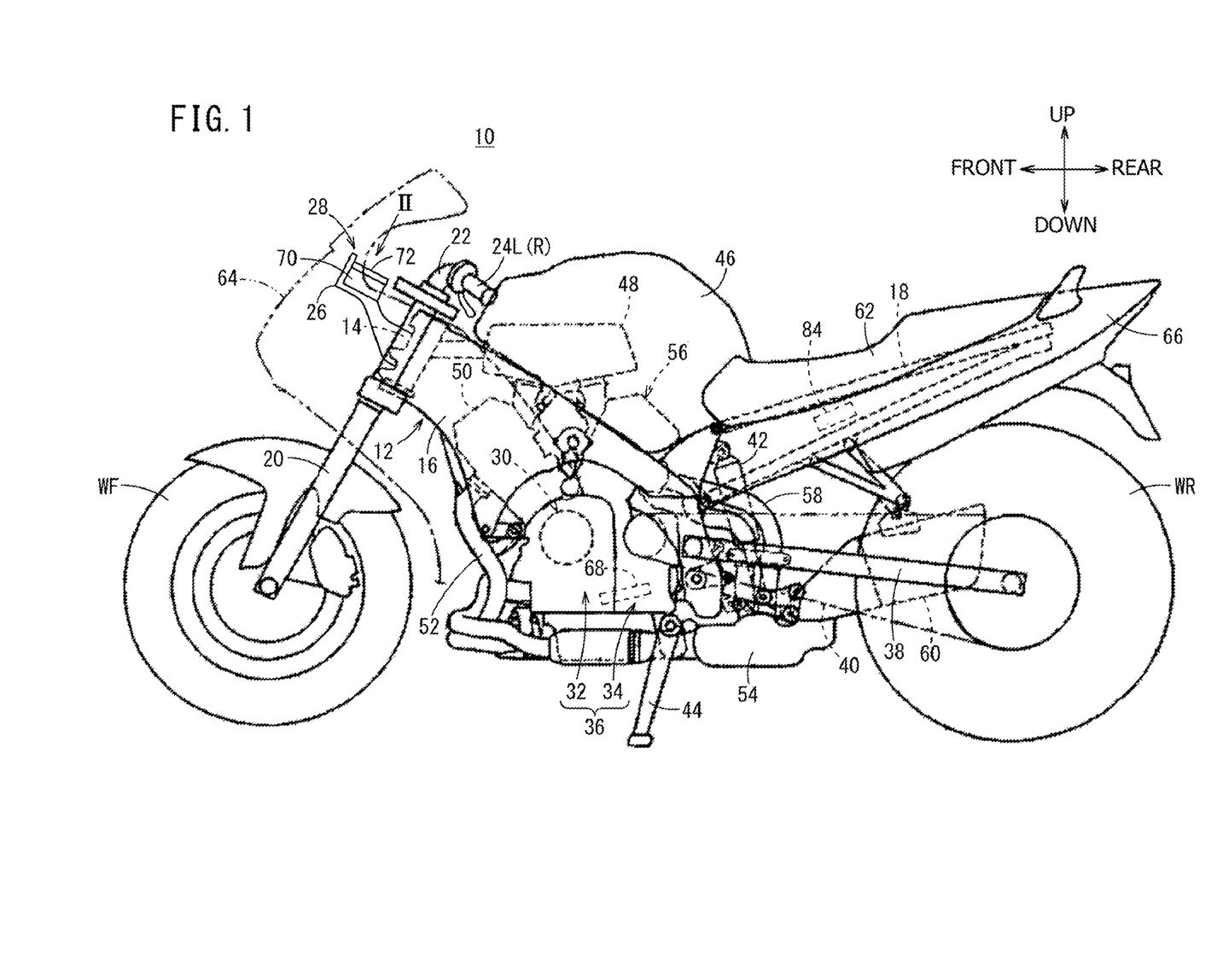
FIG. 1 is an outer left side view of a motorcycle to which a vehicle meter indicator device according to the present embodiment applies.

FIG. 1 is an outer left side view of a motorcycle 10. It should be noted that, unless otherwise specified, the longitudinal, horizontal, and vertical directions of the motorcycle 10 will be described relative to the directions as seen from the driver of the same vehicle 10.

A vehicle body frame 12 of the motorcycle 10 has a head pipe 14, a main frame 16, and a seat frame 18. The main frame 16 extends rearward and downward from the head pipe 14. The seat frame 18 extends rearward and upward from near the rear portion of the main frame 16. The head pipe 14 pivotally supports a front fork 20 in a rotatable manner. The front fork 20 supports a front wheel WF, i.e., a steering wheel, in a rotatable manner.

A handle bar 22 is attached to the upper portion of the front fork 20 with handle grips 24L and 24R provided respectively on the left and right of the handle bar 22. The driver can steer the front wheel WF by holding and steering the left and right handle grips 24L and 24R.

A liquid crystal display device 28 serving as a meter unit is disposed via a bracket 26 above the head pipe 14 and in front of the handle bar 22.

A power unit 36 is attached to the lower portion of the main frame 16. The power unit 36 includes an engine 32 and a transmission 34. The engine 32 is a V type four-cylinder internal combustion engine having a crankshaft 30 arranged along the vehicle width, i.e., the horizontal direction. Power delivered by the crankshaft 30, i.e., the main shaft of the engine 32, is transferred to a rear wheel WR serving as a driving wheel via the transmission 34.

A swing arm 38 that pivotally supports the rear wheel WR in a rotatable manner is swingably supported by the rear lower portion of the main frame 16. The driving force of the engine 32 delivered via the transmission 34 is transferred to the rear wheel WR, i.e., the driving wheel, via a drive chain 40. The swing arm 38 is suspended at the rear upper portion of the main frame 16 by a rear shock unit 42. A side stand 44 is attached to the left side of the rear lower edge portion of the main frame 16. The side stand 44 supports the vehicle body when the vehicle comes to a stop.

A fuel tank 46 and an air cleaner box 48 are provided on the upper portion of the main frame 16. Exhaust gas from a front cylinder 50 of the engine 32 is sent to an expansion chamber 54 via a front exhaust pipe 52. Exhaust gas from a rear cylinder 56 of the engine 32 is sent to the expansion chamber 54 via a rear exhaust pipe 58. Exhaust gas sent to the expansion chamber 54 is discharged rearward of the vehicle body via a muffler 60.

A seat 62 on which the driver sits is provided above the seat frame 18. A front cowl 64 is provided in front of the head pipe 14 and the liquid crystal display device 28. The front cowl 64 covers the front of the vehicle body. A rear cowl 66 is provided on the side portions and in rear of the seat frame 18 to cover the sides and rear of the vehicle body.

Further, a shift pedal 68 is provided on the motorcycle 10. The driver can change the shift position by stepping on the shift pedal 68.

Figure 2:
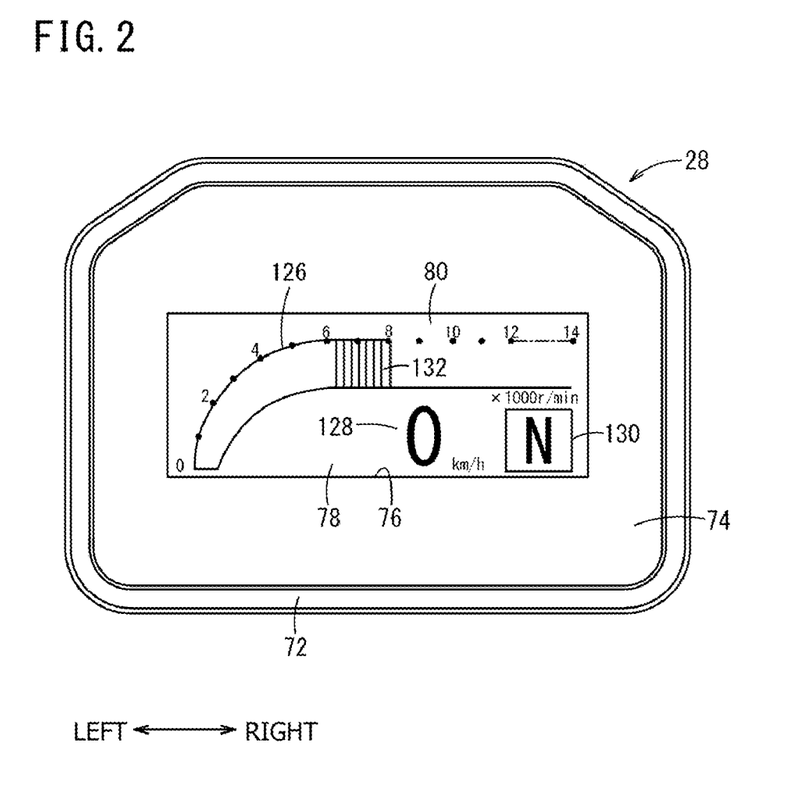
FIG. 2 is a view of a liquid crystal display device taken along arrow II in FIG. 1.

FIG. 2 is a view of the liquid crystal display device 28 taken along arrow II in FIG. 1 as seen from the driver seated on the seat 62.

The liquid crystal display device 28 is structured so that a bottomed cylindrical housing 70 attached to the bracket 26 shown in FIG. 1 is covered with a cover member 72. A lens 74 colored black on the rear surface, for example, is fitted in the cover member 72. A rectangular opening 76 is formed in the center portion of the lens 74. In this case, a liquid crystal panel 78 is visible through the opening 76 when the driver sees the liquid crystal display device 28. A variety of information about the motorcycle 10 such as an engine rotation speed Ne, vehicle speed, and shift position, appears on a display surface 80 of the liquid crystal panel 78.

Figure 3:
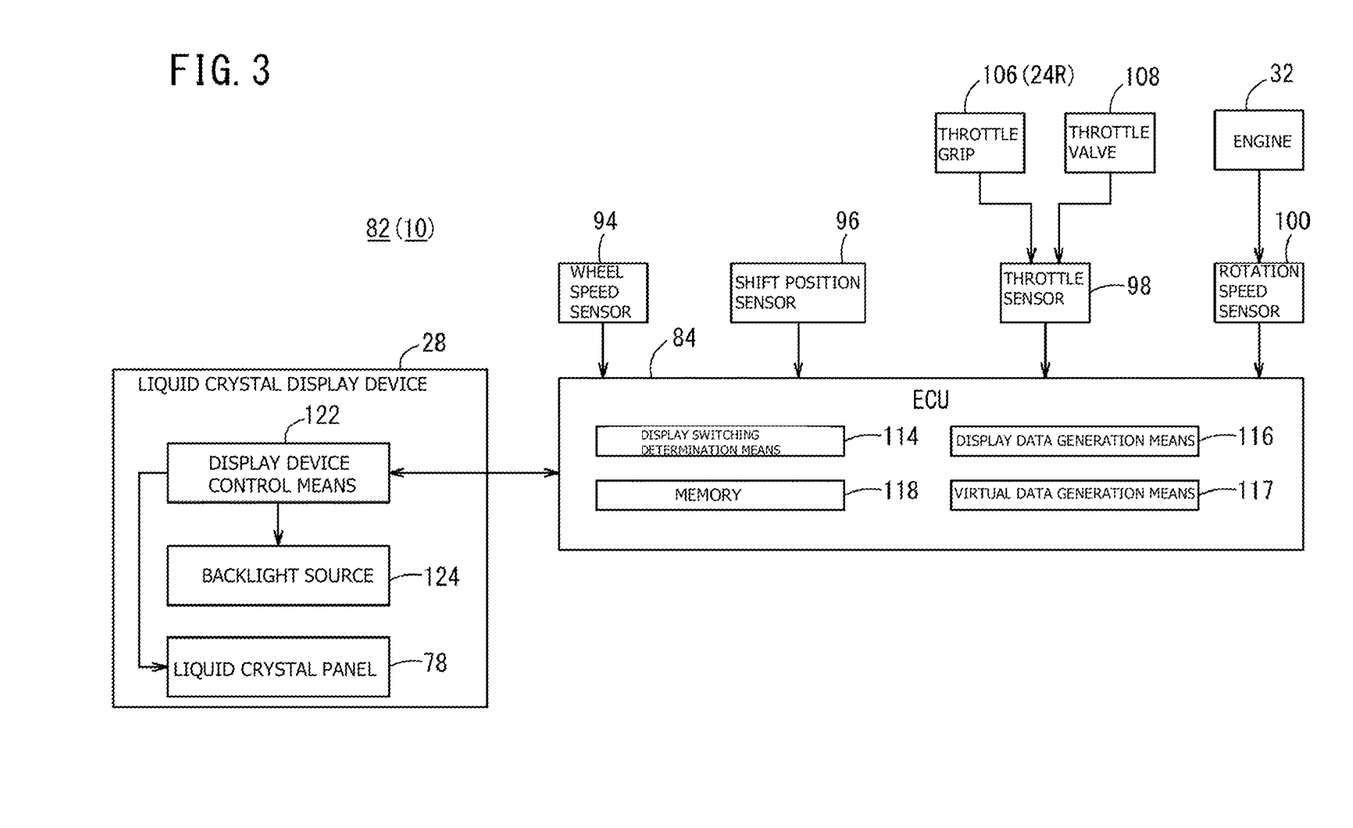
FIG. 3 is a block diagram of the motorcycle including the vehicle meter indicator device according to the present embodiment.

FIG. 3 is a block diagram of the motorcycle 10 to which a vehicle meter indicator device 82 according to the present embodiment is applied.

The vehicle meter indicator device 82 includes the liquid crystal display device 28, an ECU 84, and a variety of switches and sensors provided on the motorcycle 10. The ECU 84 controls, for example, the power unit 36 shown in FIG. 1. Output signals from the switches and detection signals from the sensors are supplied to the ECU 84. It should be noted that the ECU 84 is provided, for example, inside the rear cowl 66 immediately below the seat 62 at a distance from the power unit 36.

More specifically, a wheel speed sensor 94, a shift position sensor 96, a throttle sensor 98, and a rotation speed sensor 100 are provided on the motorcycle 10.

The wheel speed sensor 94 detects the speed of the motorcycle 10 and outputs the detected speed to the ECU 84.

The shift position sensor 96 detects the shift position when the driver changes the shift position by manipulating the shift pedal 68, and outputs the detected shift position to the ECU 84. It should be noted that a manually operated shift switch may be provided in place of the shift pedal 68 so that the shift position at the time of manipulation of the shift switch by the driver is detected.

The throttle sensor 98 is a grip position sensor adapted to detect the amount by which the right handle grip 24R serving as a throttle grip 106 is operated by the driver. Alternatively, the throttle sensor 98 is a throttle position sensor adapted to detect the actual opening angle of a throttle valve 108 based on the amount of operation of the handle grip 24R. Therefore, the throttle sensor 98 outputs a detection signal proportional to the detected amount of operation or actual opening angle to the ECU 84.

The rotation speed sensor 100 detects the engine rotation speed Ne of the engine 32 and outputs the detected rotation speed to the ECU 84.

Incidentally, in the vehicle meter indicator device 82, the ECU 84 acquires information from various switches and sensors at every given acquisition interval Ts. Therefore, the ECU 84 generates display data proportional to the image shown on the display surface 80 of the liquid crystal panel 78 on the basis of information from various switches and sensors, and outputs the generated display data to the liquid crystal display device 28. The liquid crystal display device 28 shows the display data from the ECU 84 on the display surface 80 of the liquid crystal panel 78 as an image.

In this case, the ECU 84 basically generates display data at every arbitrary frame interval Tf on the basis of the latest information acquired from each of the switches and sensors. Further, the liquid crystal display device 28 updates the image shown on the display surface 80 of the liquid crystal panel 78 each time display data is supplied. That is, the liquid crystal display device 28 updates the image shown on the display surface 80 at every updating cycle, i.e., the frame interval Tf. It should be noted that the frame interval Tf may be occasionally referred to as the updating cycle Tf in the description given below.

Figure 7:
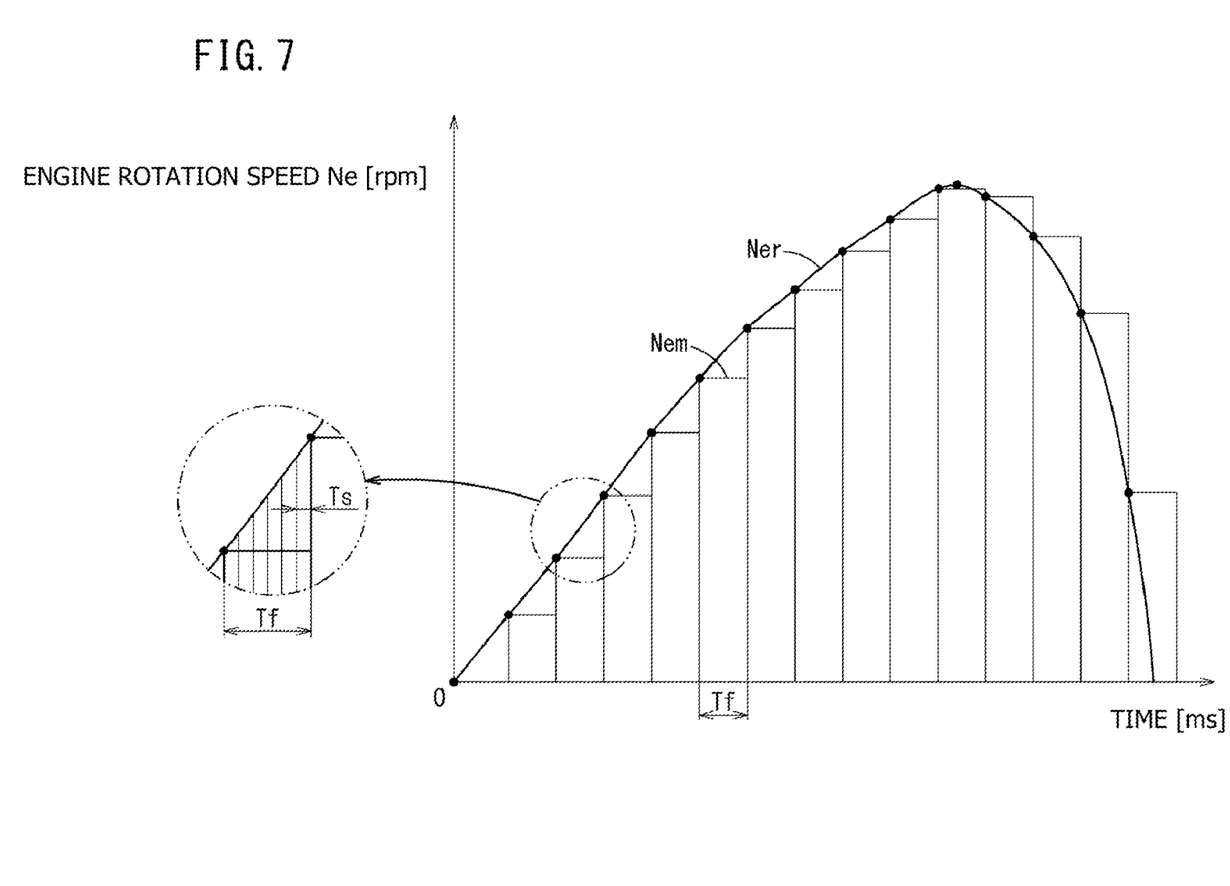
FIG. 7 is a timing chart illustrating the relationship between the engine rotation speed detected by a rotation speed sensor and that shown on the liquid crystal panel; and, FIG. 8 is a timing chart illustrating the relationship between the engine rotation speed detected by the rotation speed sensor and that shown on the liquid crystal panel.

Here, if the interval Ts at which information is acquired from each of the switches and sensors is shorter than the updating cycle Tf of an image on the liquid crystal panel 78, i.e., the updating cycle Tf for the ECU 84 to generate display data, as illustrated in FIG. 7, and even if these pieces of information vary approximately continuously with respect to the passage of time, the current on-screen image shown, for updating, on the display surface 80 of the liquid crystal panel 78 at every updating cycle Tf exhibits a significant, unsmooth, and therefore, intermittent, change from the previous one. As a result, the driver is likely to feel a sense of discomfort from the image shown on the display surface 80 of the liquid crystal panel 78.

For this reason, in the present embodiment, the ECU 84 includes display switching determination device 114, display data generator 116, virtual data generator 117, and a memory 118. On the other hand, the liquid crystal display device 28 further includes, in addition to the aforementioned liquid crystal panel 78, a display device controller 122 and a backlight source 124.

The display switching determination device 114 determines whether or not display data should be generated on the basis of a latest engine rotation speed $Ne(n)$ acquired this time if an actual engine rotation speed Ner is acquired at every acquisition interval Ts from the rotation speed sensor 100 and if the display data generator 116 generates display data based on the engine rotation speed Ner at every updating cycle Tf.

In this case, if the engine rotation speed Ner is on the increase, that is, if the latest engine rotation speed $Ne(n)$ acquired this time is equal to an engine rotation speed $Ne(n-1)$ used to generate the previous display data or higher, the display switching determination device 114 basically determines that display data should be generated on the basis of the latest engine rotation speed $Ne(n)$ acquired this time.

On the other hand, if the engine rotation speed Ner is on the decline, and if the absolute value of a difference $|Ne(n)-Ne(n-1)|$ between the previous engine rotation speed and that acquired this time is greater than an arbitrary change threshold ($\Delta$Neth), the display switching determination device 114 determines that virtual data should be generated on the basis of an arbitrary engine rotation speed Ned between the previous engine rotation speed $Ne(n-1)$ shown on the display surface 80 of the liquid crystal panel 78 and the engine rotation speed $Ne(n)$ acquired this time.

That is, if display data is generated on the basis of the engine rotation speed $Ne(n)$ acquired this time and shown on the display surface 80 of the liquid crystal panel 78 as an image, the driver may perceive a sense of discomfort. In the present embodiment, therefore, virtual data based on the arbitrary engine rotation speed Ned is shown on the display surface 80 as a virtual image. This ensures minimal sense of discomfort perceived by the driver because the screen shows a gradual decline in the engine rotation speed Ner for smooth image display even in the event of a sharp decline in the engine rotation speed Ner with time.

Further, even if the engine rotation speed Ner is on the decline, but when |Ne(n)−Ne(n−1)| is equal to the change threshold ΔNeth or less, the display switching determination device 114 determines that display data should be generated on the basis of the engine rotation speed Ne(n) acquired this time. That is, when |Ne(n)−Ne(n−1)| is equal to the change threshold ΔNeth or less, an image is shown smoothly even if display data, generated using the latest engine rotation speed Ne(n) acquired this time, is shown on the display surface 80 as an image, thus making it unlikely for the driver to feel a sense of discomfort.

It should be noted that the arbitrary engine rotation speed Ned refers to a rotation speed that declines on a regular basis at every updating cycle Tf and refers, for example, to a rotation speed that declines by 200 rpm that is equivalent to a single scale division 132 described later from the previous engine rotation speed Ne(n−1) every updating cycle Tf of 50 ms.

If the display switching determination device 114 determines that display data should be generated, the display data generator 116 generates display data on the basis of the determination result, outputting the generated display data to the liquid crystal display device 28 and storing the data in the memory 118. If the display switching determination device 114 determines that virtual data should be generated, the virtual data generator 117 generates virtual data on the basis of the determination result, outputting the generated virtual data to the liquid crystal display device 28 and storing the data in the memory 118. Therefore, the aforementioned display switching determination device 114 need only make the above determination on the basis of the engine rotation speed Ne(n−1) in the previous display data or virtual data stored in the memory 118 and the engine rotation speed Ne(n) acquired this time.

Figure 4A:
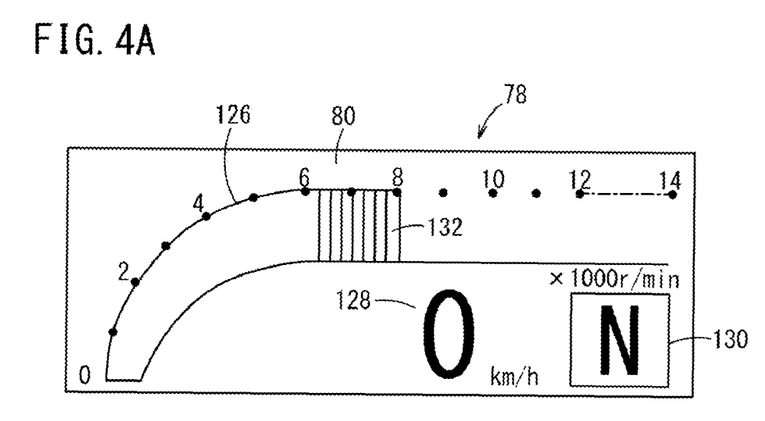
FIGS. 4A and 4B are explanatory views illustrating what is shown on the display surface of a liquid crystal panel when an engine rotation speed is on the increase.
Figure 4B:
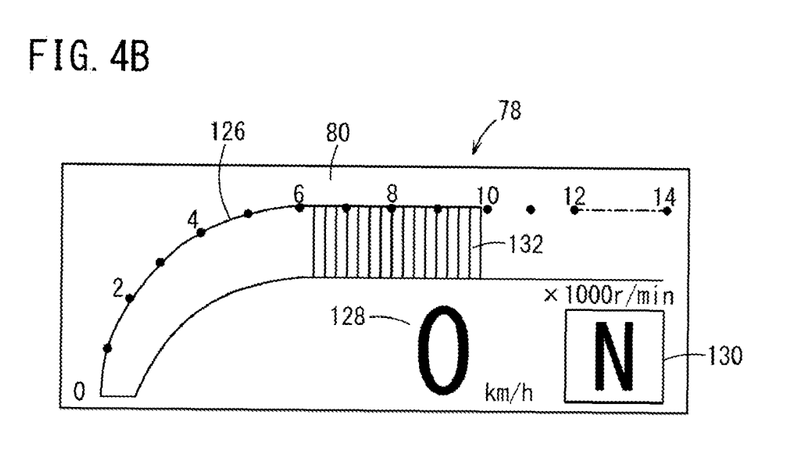
Figure 5:
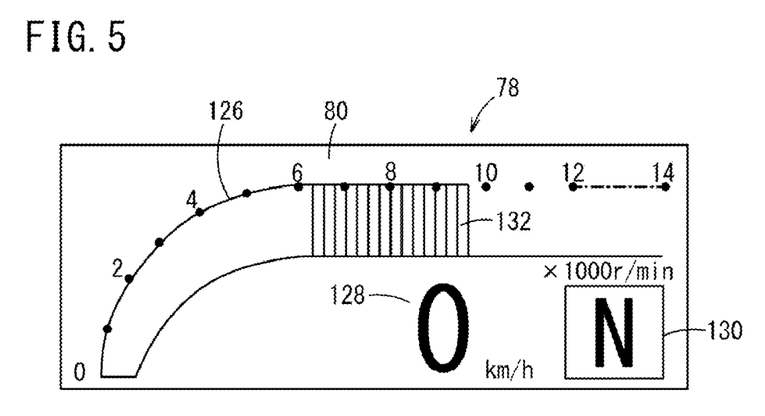
FIG. 5 is an explanatory view illustrating what is shown on the display surface of the liquid crystal panel when the engine rotation speed is on the decline.

FIGS. 4A to 5 illustrate what is shown on the display surface 80 of the liquid crystal panel 78. A rotation speed indication 126, a vehicle speed indication 128, and a shift position indication 130 appear on the display surface 80. The rotation speed indication 126 indicates the engine rotation speed Ne. The vehicle speed indication 128 shows the vehicle speed. The shift position indication 130 shows the shift position.

In this case, the rotation speed indication 126 contains a bar chart that represents the engine rotation speed Ne and grows in an arc-shaped manner from 0 rpm at the left corner to about 6000 rpm as the engine rotation speed Ne increases. The bar chart grows approximately horizontally toward the right side when the engine rotation speed Ne is equal to about 6000 rpm or more. Further, the rotation speed indication 126 shows the scale divisions 132, each representing, for example, 200 rpm, when the engine rotation speed Ne is equal to 6000 rpm or greater.

Then, FIGS. 4A and 4B illustrate what is shown on the display surface 80 of the liquid crystal panel 78 when the engine rotation speed Ne is on the increase after the motorcycle 10 has come to a stop with the shift position in the neutral position "N" and idling. That is, if the driver snaps the throttle grip 106 to accelerate and races the engine 32 with the motorcycle 10 at stop, the rotation speed indication 126 increases from 8000 rpm in FIG. 4A to 10000 rpm in FIG. 4B when the updating cycle Tf elapses.

It should be noted that when the engine rotation speed Ne increases, display data is generated on the basis of the latest engine rotation speed Ne acquired by the ECU 84 immediately before updating, and the generated display data appears on the display surface 80 as an image. Therefore, the rotation speed indication 126 in FIGS. 4A and 4B shows the actual engine rotation speed Ner of the motorcycle 10.

On the other hand, FIG. 5 illustrates what is shown on the display surface 80 of the liquid crystal panel 78 when the engine rotation speed Ne is on the decline if the motorcycle 10 has come to a stop with the shift position in the neutral position "N" and the driver snaps the throttle grip 106 to accelerate. In this case, if the driver stops snapping the throttle grip 106 to accelerate, the rotation speed indication 126 declines from 10000 rpm in FIG. 4B to 9800 rpm in FIG. 5 when the updating cycle Tf elapses. Therefore, the number of scale divisions 132 in the rotation speed indication 126 in FIG. 5 is one less than that in FIG. 4B.

It should be noted, however, that if the engine rotation speed Ne declines as described above, the display switching determination device 114 determines that virtual data should be generated, and that the virtual data generator 117 generates virtual data on the basis of the determination result. Therefore, the rotation speed indication 126 of FIG. 5 shows the engine rotation speed Ne of the virtual data that is different from the actual engine rotation speed Ner of the motorcycle 10.

The motorcycle 10 having the vehicle meter indicator device 82 according to the present embodiment is configured as described above. A description will be given next of the display operation of the vehicle meter indicator device 82 with reference to FIGS. 6 to 8. It should be noted that this description will be given by referring to FIGS. 1 to 5 as necessary.

Figure 6:
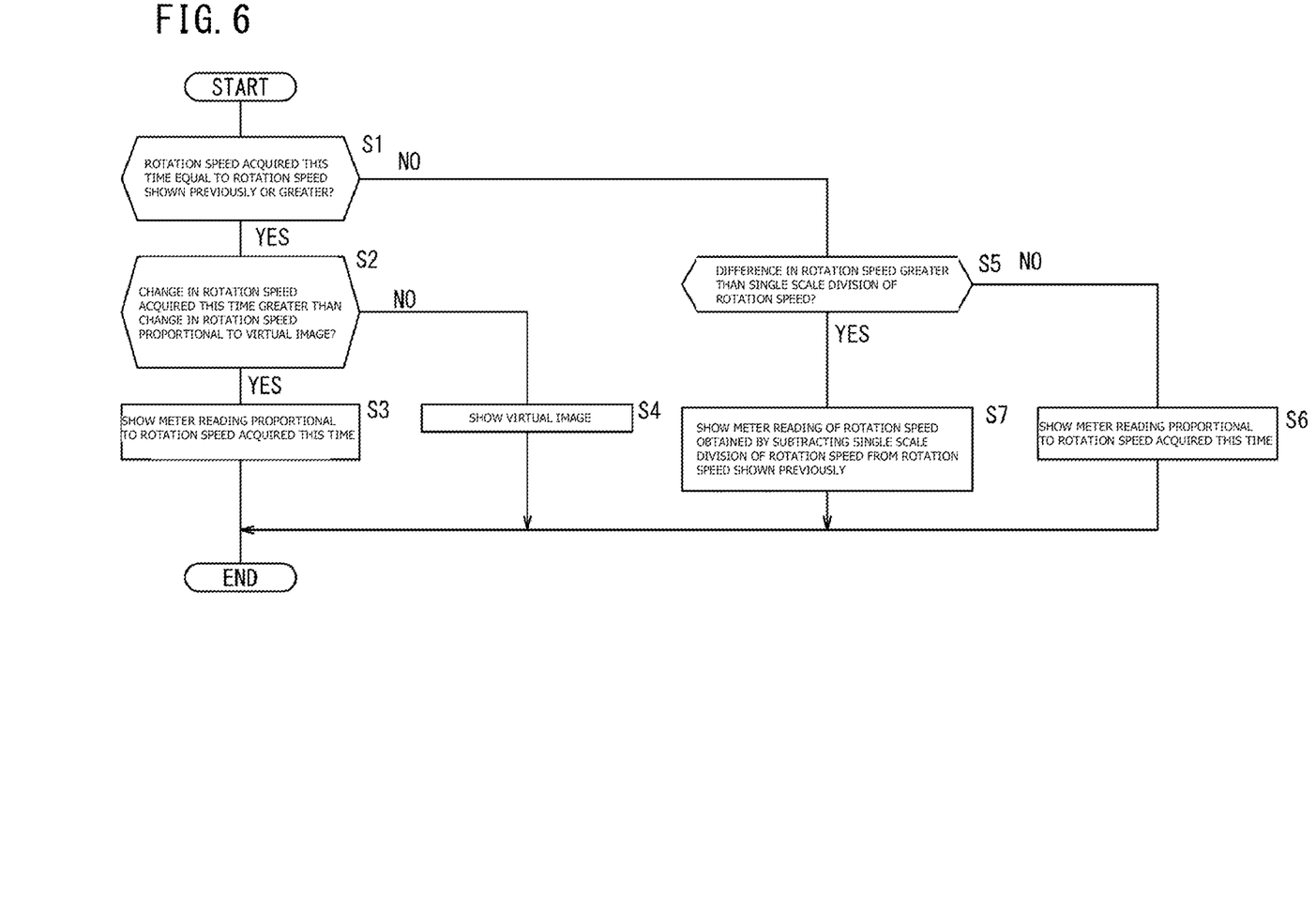
FIG. 6 is a flowchart for describing the operation of the vehicle meter indicator device according to the present embodiment.

FIG. 6 is a flowchart illustrating the process performed by the ECU 84 and the liquid crystal display device 28. This process is repeated every given updating cycle Tf.

A description will be given here of the operation of the vehicle meter indicator device 82 when the driver snaps the accelerator by operating the throttle grip 106 with the motorcycle 10 at stop and the shift position in the neutral position.

Figure 8:
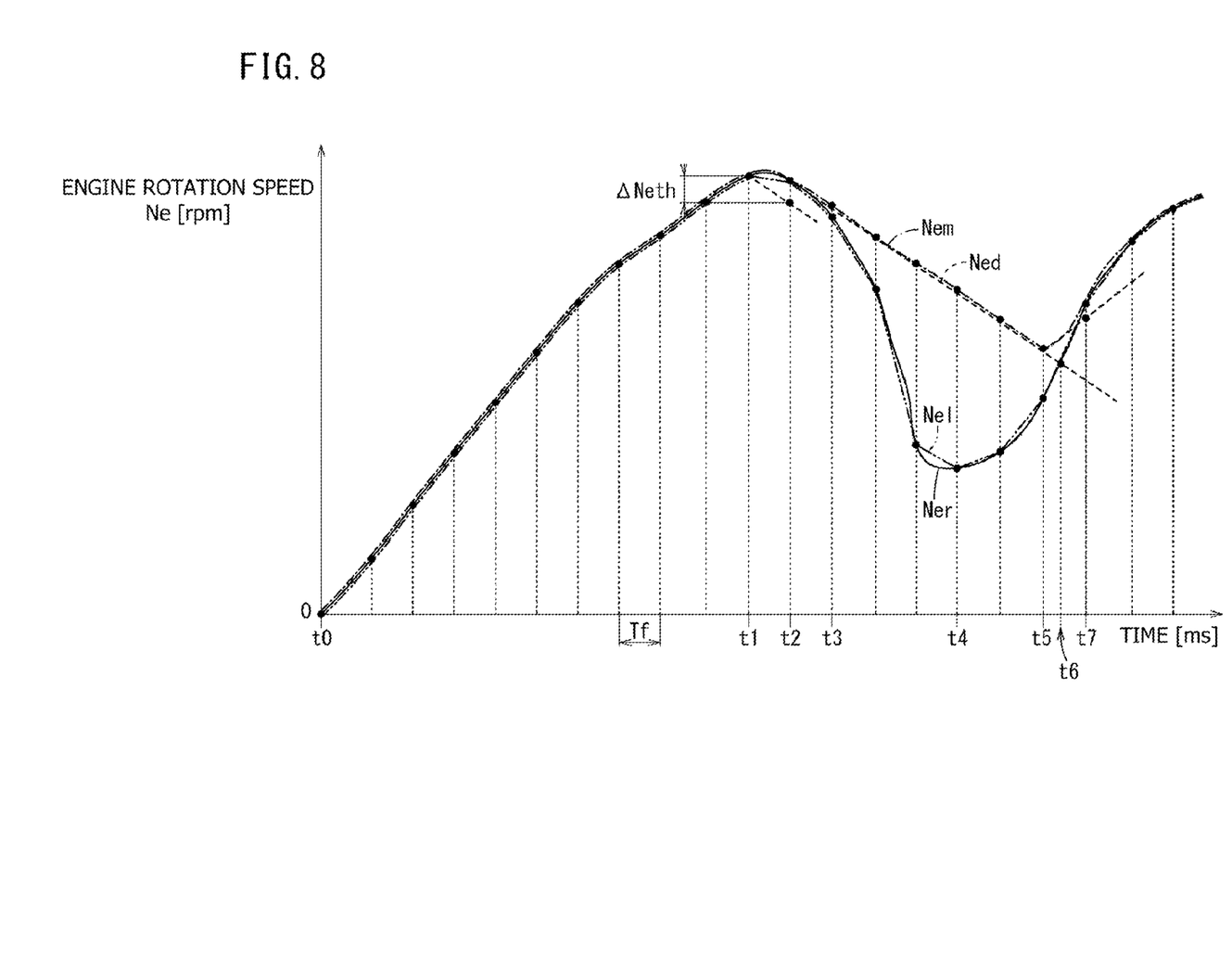

Further, in this description of operation, three time zones will be described, one from time t0 to time t1, another from time t1 to time t4, and still another from time t4 onwards, as illustrated in FIGS. 7 and 8. During the first time zone, the engine rotation speed Ne increases as a result of the driver snapping the accelerator. During the second time zone, the engine rotation speed Ne drops sharply as a result of the driver stopping snapping the accelerator. During the third time zone, the engine rotation speed Ne increases again as a result of the driver snapping the accelerator again after the engine rotation speed Ne drops sharply.

It should be noted that the actual engine rotation speed Ne detected by the rotation speed sensor 100 is denoted by the solid line Ner and that the engine rotation speed Ne shown on the display surface 80 of the liquid crystal panel 78 as the rotation speed indication 126 is denoted by a long dashed short dashed line Nem. Further, FIG. 8 illustrates display data prepared using the latest engine rotation speed Ner at every updating cycle Tf. The engine rotation speed Ne of the rotation speed indication 126 during display of the display data on the display surface 80 as an image is denoted by a long dashed double-short dashed line Nel. Still further, FIG. 8 illustrates, as a dashed line Ned, the engine rotation speed Ne when the number of scale divisions 132 is reduced one at a time at every updating cycle Tf during decline in the engine rotation speed Ner.

As described earlier, the ECU 84 generates display data at every updating cycle Tf, and the liquid crystal display device 28 shows, for updating, the display data as an image at every updating cycle Tf. In the meantime, the acquisition interval Ts at which the ECU 84 acquires information from various switches and sensors is shorter than the updating cycle Tf.

Therefore, when the driver snaps the accelerator by operating the throttle grip 106, the actual engine rotation speed Ner detected by the rotation speed sensor 100 changes approximately continuously with time as schematically illustrated in FIG. 7. On the other hand, the engine rotation speed Nem shown as the rotation speed indication 126 on the display surface 80 of the liquid crystal panel 78 is a discrete value that changes in a stepped manner with time. Therefore, the rotation speed indication 126 on the display surface 80 shows an intermittent image that is shown, for updating, at every updating cycle Tf. This is particularly conspicuous when the engine rotation speed Ner diminishes.

It should be noted that, in FIG. 7, the bullets representing the intersections between the solid line that shows the actual engine rotation speed Ner and the bar graph that shows the engine rotation speed Nem appearing as the rotation speed indication 126 indicate that display data is generated using the engine rotation speed Ner at the time of that bullet and shown in the rotation speed indication 126 as an image.

For this reason, during the time zone from time t0 to time t1 in FIG. 8 in which the engine rotation speed Ne increases, the display switching determination device 114 determines, in step S1 of FIG. 6, whether or not the engine rotation speed Ne(n) acquired this time is larger than the engine rotation speed Ne(n-1) acquired previously.

If determining that the engine rotation speed Ne has increased because the engine rotation speed Ne(n) acquired this time is larger than the engine rotation speed Ne(n-1) acquired previously, the display switching determination device 114 determines, in next step S2, whether or not the change between the engine rotation speed Ne(n) acquired this time and the engine rotation speed Ne(n-1) acquired previously, i.e., the change in the actual engine rotation speed Ner at the updating cycle Tf, is greater than the single scale division 132 of rotation speed (change threshold ($\Delta$Neth)) which is the change in the engine rotation speed Ned proportional to the virtual image.

If determining that the change in the actual engine rotation speed Ner at the updating cycle Tf is greater than the single scale division 132 of rotation speed, the display switching determination device 114 determines, on the basis of the determination result, that display data should be shown on the basis of the engine rotation speed Ne(n) acquired this time. As a result, the display data generator 116 generates, in next step S3, display data on the basis of each of the determination results of the display switching determination device 114 in steps S1 and S2. Display data includes the engine rotation speed Ne(n) acquired this time, the vehicle speed acquired from the wheel speed sensor 94, and the shift position acquired from the shift position sensor 96. The display data generator 116 outputs the generated display data to the liquid crystal display device 28 and stores the data in the memory 118.

The display device controller 122 of the liquid crystal display device 28 shows the supplied display data on the display surface 80 of the liquid crystal panel 78 as an image and irradiates backlight onto the liquid crystal panel 78 from the backlight source 124. As a result, the screen shown in FIG. 4A or 4B appears on the display surface 80 of the liquid crystal panel 78. This allows the driver to visually recognize the rotation speed indication 126, the vehicle speed indication 128, and the shift position indication 130 that appear at a desired brightness.

During the time zone from time t0 to time t1 in which the engine rotation speed Ne increases, therefore, the processes from step S1 to step S3 in FIG. 6 are repeated, thus showing the engine rotation speed Nem of the rotation speed indication 126 proportional to the actual engine rotation speed Ner on the display surface 80 of the liquid crystal panel 78. As a result, the driver who is snapping the throttle grip 106 to accelerate can confirm the engine rotation speed Nem without feeling a sense of discomfort.

That is, as illustrated in FIG. 8, during the time zone from time t0 to time t1, the actual engine rotation speed Ner detected by the rotation speed sensor 100, a latest engine rotation speed Nel used to generate display data at every updating cycle Tf, and the engine rotation speed Nem shown on the rotation speed indication 126 are approximately the same, thus ensuring minimal sense of discomfort perceived by the driver.

It should be noted that if, in step S2, the change in the actual engine rotation speed Ner is equal to the change threshold $\Delta$Neth, i.e., the change in the engine rotation speed Ned proportional to the virtual image, or less, the display switching determination device 114 determines that virtual data should be generated rather than display data, and the virtual data generator 117 generates virtual data in next step S4 on the basis of the determination result in step S2.

That is, the virtual data generator 117 generates virtual data proportional to the arbitrary engine rotation speed Ne between the previously acquired engine rotation speed Ne(n-1) appearing on the display surface 80 and the latest engine rotation speed Ne(n) acquired this time. For example, the virtual data generator 117 generates virtual data that shows an engine rotation speed obtained by adding the single scale division 132 of rotation speed to the previous engine rotation speed Ne(n-1). The liquid crystal display device 28 shows the generated virtual data in the rotation speed indication 126 as a virtual image. This makes it unlikely for the driver to feel a sense of discomfort because an image is displayed smoothly with time on the display surface 80 even in the event of decline in the rate of increase of the engine rotation speed Ner during sharp increase of the engine rotation speed Ner.

Next, during the time zone from time t1 to time t2 in FIG. 8, the engine rotation speed Ne stops increasing and starts to decline as a result of the driver stopping snapping the throttle grip 106 to accelerate.

Then, at time t2, the display switching determination device 114 performs the process in step S1 and determines that the engine rotation speed Ne has started to decline because the engine rotation speed Ne(n) acquired this time is slightly lower than the engine rotation speed Ne(n-1) acquired previously at time t1.

If determining that the engine rotation speed Ne(n) acquired this time is lower than the engine rotation speed Ne(n-1) acquired previously, the display switching determination device 114 determines in step S5 whether or not the absolute value of the difference |Ne(n)-Ne(n-1)| between the engine rotation speed Ne(n) acquired this time and the engine rotation speed Ne(n-1) acquired previously is greater than the change threshold $\Delta$Neth, i.e., the rotation speed proportional to the single scale division 132 of the rotation speed indication 126.

During the time zone from time t1 to time t2, the decline in the engine rotation speed Ne remains within the bounds of the single scale division 132 or so. Therefore, the display switching determination device 114 determines that display data should be shown on the basis of the engine rotation speed Ne(n) acquired this time.

If the display switching determination device 114 determines that |Ne(n)−Ne(n−1)| is smaller than the change threshold ΔNeth, the display data generator 116 generates display data in next step S6 on the basis of the determination result of the display switching determination device 114 in step S5. The display data includes the engine rotation speed Ne(n) acquired this time, the vehicle speed, and the shift position. The display data generator 116 outputs the generated display data to the liquid crystal display device 28 and stores the data in the memory 118.

The display device controller 122 of the liquid crystal display device 28 shows the supplied display data on the display surface 80 of the liquid crystal panel 78 as an image and irradiates backlight onto the liquid crystal panel 78 from the backlight source 124. As a result, the screen as shown in FIG. 4B appears on the display surface 80 of the liquid crystal panel 78. This allows the driver to visually recognize the rotation speed indication 126, the vehicle speed indication 128, and the shift position indication 130 that appear at a desired brightness.

Therefore, even if the actual engine rotation speed Ner stops increasing and starts to decline during the time zone from time t1 to time t2, the rotation speed indication 126 on the display surface 80 of the liquid crystal panel 78 shows the actual engine rotation speed Ner, i.e., the engine rotation speed Ne(n) acquired this time, thanks to the processes in steps S1, S5, and S6 in FIG. 6. This allows the driver to confirm the engine rotation speed Nem without feeling a sense of discomfort.

Next, during the time zone from time t2 to time t4 in FIG. 8, the driver stops snapping the throttle grip 106 to accelerate, thus causing the engine rotation speed Ne to decline sharply.

Therefore, the display switching determination device 114 performs the process in step S1 and determines that the engine rotation speed Ne is on the decline because the engine rotation speed Ne(n) acquired this time is lower than the engine rotation speed Ne(n−1) acquired previously.

If determining that the engine rotation speed Ne is on the decline, the display switching determination device 114 determines in next step S5 whether or not |Ne(n)−Ne(n−1)| is greater than the change threshold ΔNeth. During the time zone from time t2 to time t4, the engine rotation speed Ne declines significantly, thus resulting in |Ne(n)−Ne(n−1)|>ΔNeth. Therefore, the display switching determination device 114 determines that if display data is generated on the basis of the engine rotation speed Ne(n) acquired this time, the image proportional to the display data will produce an image that will cause a sense of discomfort to the driver.

For this reason, the display switching determination device 114 determines whether virtual data should be generated on the basis of the engine rotation speed Ne obtained by subtracting the rotation speed equivalent to the single scale division 132 from the engine rotation speed Ne(n−1) for the display data generated previously, i.e., the engine rotation speed Nem currently shown on the rotation speed indication 126.

In step S7, the virtual data generator 117 generates virtual data on the basis of the determination result of the display switching determination device 114 in step S5. The virtual data includes the engine rotation speed Ned, the vehicle speed, and the shift position. The engine rotation speed Ned is obtained by subtracting the rotation speed equivalent to a single scale division from the previous engine rotation speed Ne(n−1). The virtual data generator 117 outputs the generated virtual data to the liquid crystal display device 28 and stores the data in the memory 118.

As a result, a screen showing the virtual image illustrated in FIG. 5 appears on the display surface 80 of the liquid crystal panel 78. The rotation speed indication 126 shows the engine rotation speed Nem. The number of scale divisions 132 is one less than that in FIG. 4B. This allows the driver to visually recognize the rotation speed indication 126, the vehicle speed indication 128, and the shift position indication 130 that appear at a desired brightness.

As described above, despite a sharp decline in the actual engine rotation speed Ner during the time zone from time t2 to time t4, the rotation speed indication 126 on the display surface 80 of the liquid crystal panel 78 shows that the number of scale divisions 132 diminishes by one at every updating cycle Tf thanks to repetition of the processes in steps S1, S5, and S7 in FIG. 6. That is, despite a sharp decline in the actual engine rotation speed Ner, the rotation speed indication 126 shows a gradual decline in the engine rotation speed Ner with time for smooth image display.

That is, in the present embodiment, virtual data is generated using the engine rotation speed Ned rather than the latest engine rotation speed Nel. With the engine rotation speed Ned, the number of scale divisions 132 diminishes by one at every updating cycle Tf. This virtual data is shown on the display surface 80 as a virtual image. As described above, during the time zone from time t2 to time t4, Ned=Nem. Therefore, the driver can confirm the engine rotation speed Nem without feeling a sense of discomfort.

Next, during the time zone from time t4 to time t5 in FIG. 8, the driver snaps the throttle grip 106 to accelerate again, thus causing the engine rotation speed Ne to stop declining and start to increase.

However, the engine rotation speed Ner acquired this time is lower than the engine rotation speed Nem, i.e., the previous rotation speed shown on the rotation speed indication 126. In addition, the difference therebetween is greater than the change threshold ΔNeth. Therefore, the display switching determination device 114 makes a negative determination in step S1 and an affirmative determination in step S5 as with the processes during the time zone from time t2 to time t4. Therefore, the display switching determination device 114 determines that display data should be generated on the basis of the engine rotation speed Ned obtained by subtracting the rotation speed equivalent to the single scale division 132 from the engine rotation speed Nem currently shown in the rotation speed indication 126.

Then, the display data generator 116 performs the process in step S7, generating display data that includes the engine rotation speed Ned, obtained by subtracting the rotation speed equivalent to the single scale division 132 from the engine rotation speed Nem, i.e., the previous engine rotation speed Ne(n−1), and the vehicle speed and the shift position. The display data generator 116 outputs the generated display data to the liquid crystal display device 28 and stores the data in the memory 118.

The display device controller 122 shows the supplied display data on the display surface 80 of the liquid crystal panel 78 as an image and irradiates backlight onto the liquid crystal panel 78 from the backlight source 124. Also in this case, the rotation speed indication 126 appears on the display surface 80 of the liquid crystal panel 78 to show the engine rotation speed Nem with one less number of scale divisions 132 as illustrated in FIG. 5. This allows the driver to visually recognize the rotation speed indication 126, the vehicle speed indication 128, and the shift position indication 130 that appear at a desired brightness and confirm the engine rotation speed Nem without feeling a sense of discomfort.

Next, if, during the time zone from time t5 to time t7 in FIG. 8, the actual engine rotation speed Ner increases sharply beyond the engine rotation speed Ned proportional to the virtual image at time t6, Ner>Ned at time t7. Therefore, the display switching determination device 114 performs the process in step S1 and makes an affirmative determination.

In next step S2, the display switching determination device 114 determines whether or not the change in the engine rotation speed Ne(n) acquired this time, i.e., the change in the actual engine rotation speed Ner from time t5 to time t7, is greater than the single scale division 132 of rotation speed, i.e., the change in the engine rotation speed Ned proportional to the virtual image.

As illustrated in FIG. 8, the change in the actual engine rotation speed Ner from time t5 to time t7 is greater than the single scale division 132 of rotation speed which is the change in the engine rotation speed Ned from time t5 to time t7, i.e., the change threshold ΔNeth. For this reason, the display switching determination device 114 determines that the rotation speed indication 126 should show an image proportional to the actual engine rotation speed Ner acquired this time rather than a virtual image.

Then, the display data generator 116 performs the process in step S3, generating display data that includes the actual engine rotation speed Ner acquired this time, the vehicle speed, and the shift position. The display data generator 116 outputs the generated display data to the liquid crystal display device 28 and stores the data in the memory 118.

As a result, the vehicle meter indicator device 82 repeats the processes from step S1 to step S3 at every updating cycle Tf from time t7 onwards.

It should be noted if the display switching determination device 114 determines that the engine rotation speed Ne(n) acquired this time is greater than the previously acquired engine rotation speed Ne(n−1), and if the change in the actual engine rotation speed Ner is equal to the change in the engine rotation speed Ned proportional to the virtual image or less in step S2, the display switching determination device 114 determines that virtual data should be generated, and the virtual data generator 117 generates virtual data in next step S4 on the basis of the determination result in step S2. Therefore, the liquid crystal display device 28 shows a virtual image in the rotation speed indication 126 as is done during the time zone from time t2 to time t5.

As described above, the vehicle meter indicator device 82 according to the present embodiment generates virtual data on the basis of the arbitrary engine rotation speed Ned between the engine rotation speed Nem currently shown in the rotation speed indication 126 shown on the display surface 80 and the latest engine rotation speed Ner immediately before updating, which is detected by the rotation speed sensor 100, during decline in the engine rotation speed Ner in which a sense of discomfort, attributable to the change in on-screen image on the display surface 80 of the liquid crystal panel 78, is likely to be conspicuously perceived by the driver. A virtual image proportional to the generated virtual data is shown on the display surface 80 for updating.

This ensures minimal sense of discomfort felt by the driver due to the change in on-screen image without quickening the updating cycle Tf. Further, it is possible to reduce the cost of the vehicle meter indicator device 82 while at the same time alleviating a sense of discomfort produced by the difference between the actual engine rotation speed Ner and the engine rotation speed Nem shown on the rotation speed indication 126. Further, because there is no need to quicken the updating cycle Tf, it is possible to reduce the load of the ECU 84 that includes the display data generator 116 and the virtual data generator 117 and ensure minimal heat generation from the ECU 84.

Further, in the present embodiment, when the transmission of the engine 32 is in the neutral position and idling, the virtual data generator 117 generates virtual data even if the engine rotation speed Ner starts to decline instead of increasing after the driver has snapped the throttle grip 106 to accelerate. This alleviates a sense of discomfort produced by the difference between the actual engine rotation speed Ner and the engine rotation speed Nem in the rotation speed indication 126 shown on the display surface 80.

It is possible to alleviate a sense of discomfort produced by the difference between the actual engine rotation speed Ner and the engine rotation speed Nem in the rotation speed indication 126 particularly when the engine rotation speed Ner declines following warmup by increasing the engine rotation speed Ner.

Still further, a virtual image proportional to the regularly decreasing engine rotation speed Ned is shown on the display surface 80 for updating during decline in the engine rotation speed Ner, making a sense of discomfort, attributable to the change in on-screen image, even unlikely to be conspicuously felt.

Still further, if the absolute value of the difference |Ne(n)−Ne(n−1)| between the engine rotation speeds Ne is smaller than the change threshold ΔNeth, an image proportional to the latest engine rotation speed Ner is shown on the display surface 80 for updating, effectively ensuring minimal sense of discomfort attributable to the change in displayed screen.

Still further, even if the engine rotation speed Ner starts to increase after having declined once, virtual data is generated and shown on the display surface 80 for updating until the engine rotation speed Nem proportional to the virtual image currently shown on the display surface 80 is exceeded. This makes the difference between the actual engine rotation speed Ner and the engine rotation speed Nem shown on the display surface 80 less conspicuous.

Still further, if the actual engine rotation speed Ner exceeds the engine rotation speed Ned proportional to a virtual image, and if the change in the engine rotation speed Ner is greater than the change in the engine rotation speed Ned proportional to the virtual image, display data is generated on the basis of the actual engine rotation speed Ner, thus making it possible to detect a significant increase in the engine rotation speed Ner quickly. As a result, an increase in heat generation as a result of heating of the engine 32 can be detected as soon as possible. This keeps the cost of the ECU 84 susceptible to thermal impact to a minimum while at the same time effectively ensuring minimal thermal impact on the ECU 84 that includes the display data generator 116 and the virtual data generator 117. Moreover, in the motorcycle 10, the ECU 84 is arranged at a distance from the power unit 36 that includes the engine 32, thus ensuring minimal thermal impact described above.

It should be noted that although, in the above description, the rotation speed indication 126 shows a digital bar graph, the rotation speed indication 126 may show an analog needle on the display surface 80.

Further, in the present embodiment, the change threshold ΔNeth is 200 rpm which is equivalent to the single scale division 132 of rotation speed. However, the change threshold ΔNeth may be changed as appropriate. That is, the change threshold ΔNeth may be the two scale divisions 132 or more of rotation speed.

Further, although, in the present embodiment, a case has been described in which the number of scale divisions 132 of the engine rotation speed Ned is reduced one at a time at every updating cycle Tf, the number of scale divisions 132 to be reduced may be increased in a stepwise manner. For example, the number of scale divisions 132 to be reduced may be increased one at a time such as one, two, three, and so on at every updating cycle Tf. Alternatively, the number of scale divisions 132 to be reduced may be increased as in an arithmetic progression or geometric progression.

Still further, a description has been given, in the present embodiment, of generation of display data on the basis of the latest engine rotation speed Ne(n) acquired this time in next step S6 in FIG. 6 if it is determined, in step S5, that |Ne(n)−Ne(n−1)| is equal to the change threshold ΔNeth or less. In the present embodiment, virtual data may be generated in step S6 using the engine rotation speed Ne(n−1) acquired previously rather than the latest engine rotation speed Ne(n) acquired this time, followed by showing the generated virtual data on the display surface 80 as an image.

In this case, in step S6, the virtual data generator 117 generates virtual data rather than the display data generator 116 on the basis of the determination result of the display switching determination device 114 in the ECU 84. Also in this case, because virtual data is shown on the display surface 80 as a virtual image, it is unlikely for the driver to feel a sense of discomfort thanks to smooth display of the image.

Further, in the present embodiment, a description has been given of a case in which the processes from step S1 to step S3 in FIG. 6 are performed during the time zone from time t0 to time t1 in FIG. 8. In the present embodiment, if the display switching determination device 114 makes an affirmative determination in step S1 during the time zone from time t0 to time t1, the display switching determination device 114 may skip the process in step S2 to proceed with the process in step S3. In this case, in the ECU 84, the display data generator 116 generates display data and shows the generated display data on the display surface 80 as an image in step S3. As a result, in the ECU 84, the virtual data generator 117 does not generate virtual data. However, even such these processes make it unlikely for the driver to feel a sense of discomfort thanks to smooth display of the image on the display surface 80.

Although a description has been given above of the present invention with reference to a preferred embodiment, the technical scope of the present invention is not limited to that described in the above embodiment. It is apparent to those skilled in the art that various changes and modifications can be made to the above embodiment. It is apparent from the scope of the claims that the technical scope of the present invention also includes embodiments with such changes or modifications. On the other hand, the reference symbols in round brackets appearing in the scope of the claims have been provided to imitate those given in the accompanying drawings for easy understanding of the present invention. The present invention is not to be interpreted as being limited to the elements with the reference symbols.

| Description of Reference Symbols | |
|---|---|
| 10 | Motorcycle (vehicle) |
| 28 | Liquid crystal display device (meter unit) |
| 32 | Engine (internal combustion engine) |
| 68 | Shift pedal |
| 78 | Liquid crystal panel |
| 80 | Display surface |
| 82 | Vehicle meter indicator device |
| 84 | ECU |
| 94 | Wheel speed sensor |
| 96 | Shift position sensor |
| 98 | Throttle sensor |
| 100 | Rotation speed sensor |
| 106 | Throttle grip |
| 108 | Throttle valve |
| 114 | Display switching determination device |
| 116 | Display data generator |
| 117 | Virtual data generator |
| 118 | Memory |
| 122 | Display device controller |
| 124 | Backlight source |
| 126 | Rotation speed indication |
| 128 | Vehicle speed indication |
| 130 | Shift position indication |
| 132 | Scale division |
| Ne, Ned, Nel, Nem, Ner | Engine rotation speed (rotation speed) |
| Tf | Frame interval (updating cycle) |
| Ts | Acquisition interval |
| ΔNeth | Change threshold |

What is claimed is:

1. A vehicle meter indicator device comprising:

a rotation speed sensor adapted to detect a rotation speed of an internal combustion engine;

display data generator adapted to generate information based on the rotation speed at every given updating cycle as display data; and a meter unit adapted to show the display data as an image each time the display data generator generates the display data, wherein the display data generator generates display data based on the latest rotation speed detected by the rotation speed sensor at every updating cycle and causes the meter unit to show the generated display data as an image for updating, and the vehicle meter indicator device further comprises virtual data generator adapted to generate virtual data based on an arbitrary rotation speed between a previous rotation speed represented by the currently displayed image on the meter unit and the latest rotation speed and not the display data based on the latest rotation speed if the rotation speed declines, and causes the meter unit to show the generated virtual data as a virtual image for updating; and a display switching determination device adapted to determine whether to cause the display data generator to generate display data based on the latest rotation speed and also cause the meter unit to show the generated display data as an image for updating if the rotation speed declines, and if a change in the rotation speed is smaller than an arbitrary change threshold, wherein the display switching determination device is adapted to determine that display data should be generated on the basis of an arbitrary rotation speed between the previous rotation speed represented by the currently displayed virtual image on the meter unit and the detected rotation speed at every updating cycle until the previous rotation speed represented by the currently displayed virtual image on the meter unit is exceeded by the detected rotation speed even if the detected rotation speed starts to increase after having declined once, and the display switching determination device is adapted to determine that display data should be generated on the basis of the detected rotation speed if the detected rotation speed exceeds the previous rotation speed represented by the currently displayed virtual image on the meter unit and if a change in the detected rotation speed is greater than a change in the previous rotation speed represented by the currently displayed virtual image on the meter unit.

2. The vehicle meter indicator device of claim 1, wherein if the rotation speed declines with a transmission of the internal combustion engine in a neutral position, the virtual data generator generates the virtual data.

3. The vehicle meter indicator device of claim 1, wherein the arbitrary rotation speed declines on a regular basis at every updating cycle relative to the previous rotation speed represented by the currently displayed image on the meter unit.

4. The vehicle meter indicator device of claim 2, wherein the arbitrary rotation speed declines on a regular basis at every updating cycle relative to the previous rotation speed represented by the currently displayed image on the meter unit.

5. A vehicle meter indicator device comprising:
a rotation speed sensor adapted to detect a rotation speed of an internal combustion engine;
display data generator adapted to generate information based on the rotation speed at every given updating cycle as display data; and
a meter unit adapted to show the display data as an image each time the display data generator generates the display data, wherein
the display data generator generates display data based on the latest rotation speed detected by the rotation speed sensor at every updating cycle and causes the meter unit to show the generated display data as an image for updating, and
the vehicle meter indicator device further comprises
virtual data generator adapted to generate virtual data based on an arbitrary rotation speed between a previous rotation speed represented by the currently displayed image on the meter unit and the latest rotation speed and not the display data based on the latest rotation speed if the rotation speed declines, and causes the meter unit to show the generated virtual data as a virtual image for updating; and
a display switching determination device adapted to determine that display data should be generated on the basis of an arbitrary rotation speed between the previous rotation speed represented by the currently displayed virtual image on the meter unit and the detected rotation speed at every updating cycle until the previous rotation speed represented by the currently displayed virtual image on the meter unit is exceeded by the detected rotation speed even if the detected rotation speed starts to increase after having declined once.

6. The vehicle meter indicator device of claim 5, wherein if the rotation speed declines with a transmission of the internal combustion engine in a neutral position, the virtual data generator generates the virtual data.

7. The vehicle meter indicator device of claim 5, wherein the arbitrary rotation speed declines on a regular basis at every updating cycle relative to the previous rotation speed represented by the currently displayed image on the meter unit.

8. The vehicle meter indicator device of claim 5, wherein the display switching determination device is adapted to determine whether to cause the display data generator to generate display data based on the latest rotation speed and also cause the meter unit to show the generated display data as an image for updating if the rotation speed declines, and if a change in the rotation speed is smaller than an arbitrary change threshold.

9. The vehicle meter indicator device of claim 5, wherein the display switching determination device is adapted to determine that display data should be generated on the basis of the detected rotation speed if the detected rotation speed exceeds the previous rotation speed represented by the currently displayed virtual image on the meter unit and if a change in the detected rotation speed is greater than a change in the previous rotation speed represented by the currently displayed virtual image on the meter unit.

10. A vehicle meter indicator device comprising:
a rotation speed sensor adapted to detect a rotation speed of an internal combustion engine;
display data generator adapted to generate information based on the rotation speed at every given updating cycle as display data; and
a meter unit adapted to show the display data as an image each time the display data generator generates the display data, wherein
the display data generator generates display data based on the latest rotation speed detected by the rotation speed sensor at every updating cycle and causes the meter unit to show the generated display data as an image for updating, and
the vehicle meter indicator device further comprises
virtual data generator adapted to generate virtual data based on an arbitrary rotation speed between a previous rotation speed represented by the currently displayed image on the meter unit and the latest rotation speed and not the display data based on the latest rotation speed if the rotation speed declines, and causes the meter unit to show the generated virtual data as a virtual image for updating; and
a display switching determination device adapted to determine that display data should be generated on the basis of the detected rotation speed if the detected rotation speed exceeds the previous rotation speed represented by the currently displayed virtual image on the meter unit and if a change in the detected rotation speed is greater than a change in the previous rotation speed represented by the currently displayed virtual image on the meter unit.

11. The vehicle meter indicator device of claim 10, wherein
if the rotation speed declines with a transmission of the internal combustion engine in a neutral position, the virtual data generator generates the virtual data.

12. The vehicle meter indicator device of claim 10, wherein
the arbitrary rotation speed declines on a regular basis at every updating cycle relative to the previous rotation speed represented by the currently displayed image on the meter unit.

13. The vehicle meter indicator device of claim 10, wherein
the display switching determination device is adapted to determine whether to cause the display data generator to generate display data based on the latest rotation speed and also cause the meter unit to show the generated display data as an image for updating if the rotation speed declines, and if a change in the rotation speed is smaller than an arbitrary change threshold.

14. The vehicle meter indicator device of claim 10, wherein the display switching determination device is adapted to determine that display data should be generated on the basis of an arbitrary rotation speed between the previous rotation speed represented by the currently displayed virtual image on the meter unit and the detected rotation speed at every updating cycle until the previous rotation speed represented by the currently displayed virtual image on the meter unit is exceeded by the detected rotation speed even if the detected rotation speed starts to increase after having declined once.

* * * * *